C. SAUER.
PROTECTING CASING FOR INNER TUBES.
APPLICATION FILED NOV. 28, 1914.

1,146,819.

Patented July 20, 1915.

Inventor
Charles Sauer

Witnesses
Wynne Johnson

By C. L. Parker,
Attorney

UNITED STATES PATENT OFFICE.

CHARLES SAUER, OF FORT PLAIN, NEW YORK.

PROTECTING-CASING FOR INNER TUBES.

1,146,819.  Specification of Letters Patent.  Patented July 20, 1915.

Application filed November 28, 1914. Serial No. 874,397.

*To all whom it may concern:*

Be it known that I, CHARLES SAUER, a citizen of the United States, residing at Fort Plain, in the county of Montgomery and State of New York, have invented certain new and useful Improvements in Protecting-Casings for Inner Tubes, of which the following is a specification.

My invention relates to improvements in protecting casings for the inner tubes of double tube tires, particularly automobile tires, the same being adapted to be arranged between the inner tubes and the tire casings or shoes.

Important objects of the invention are, to provide a protecting casing of the above mentioned character, which is light, highly flexible, puncture proof to a high degree, inexpensive to manufacture, strong, durable, and presents substantially smooth or regular contact surfaces to the inner tube and tire casing or shoe.

Other objects and advantages of the invention will be apparent during the course of the following description.

Figure 2:
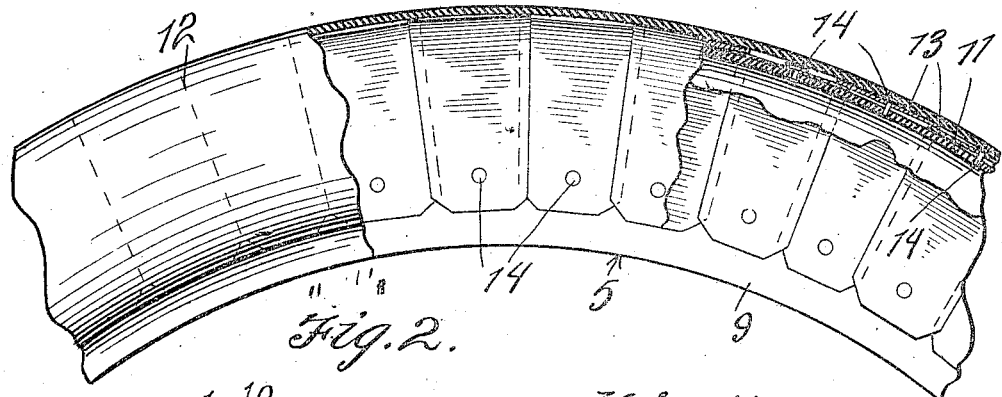
Figure 4:
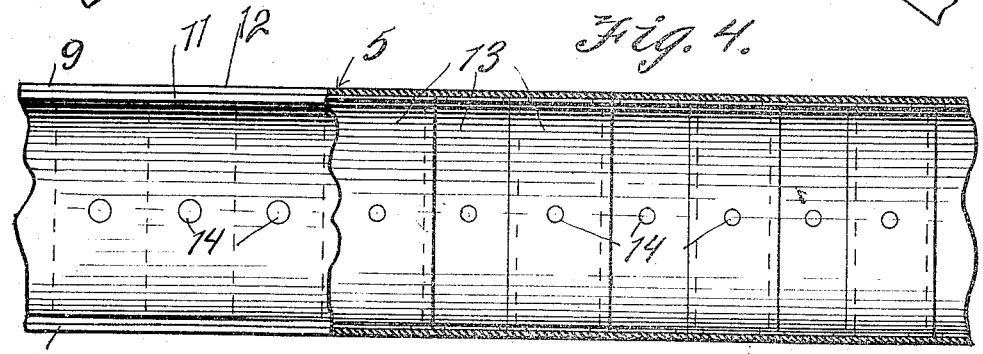
Figure 3:
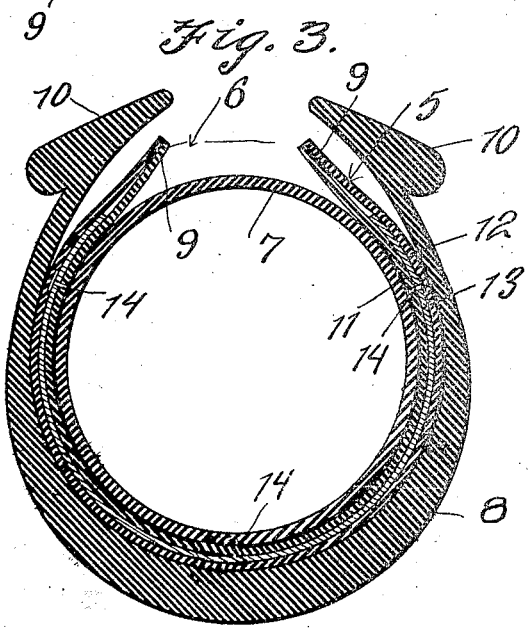
Figure 1:
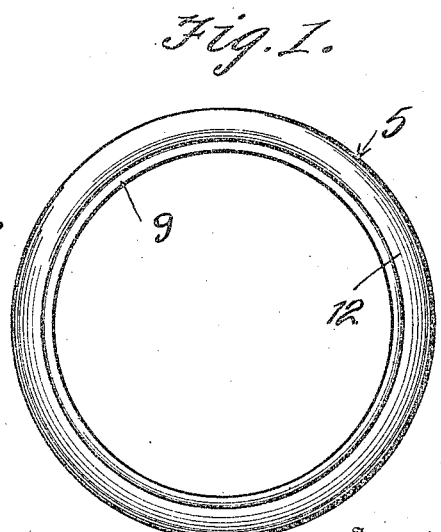

In the accompanying drawings forming a part of this specification and in which like numerals are employed to designate like parts throughout the same, Figure 1 is a side elevation of the protecting casing, removed from the tire casing or shoe, Fig. 2 is an enlarged side elevation of the same, parts being shown in progressive central longitudinal section. Fig. 3 is an enlarged transverse sectional view through the protecting casing, inner tube and tire casing or shoe, and, Fig. 4 is a bottom plan view of a portion of the protecting casing with the upper layer broken away, showing the overlapping armor plates.

In the drawings, wherein for the purpose of illustration is shown a preferred embodiment of the invention, the numeral 5 designates the improved protecting casing as a whole, the same being annular and open at its inner portion, as shown at 6, to receive the inner tube 7 and completely surround the same.

The numeral 8 designates a tire casing or shoe. The protecting casing 5 covers the entire inner surface of the tire casing 8, having its inner edges 9 arranged adjacent corresponding edges of the beads 10 of the tire casing or shoe 8, as shown.

The protecting casing 5 is formed of annular inner and outer flexible sections or strips 11 and 12, which may be formed of rubber, canvas, rubberized or rubber-coated canvas, or the like. Disposed between the sections or strips 11 and 12 are curved metallic armor plates 13, which are comparatively thin, flexible, and substantially non-resilient, the same being preferably formed of tin or iron. The armor plates 13 have their transverse edges overlapping, the alternate plates having both edges preferably arranged outwardly of and overlapping the adjacent edges of the other alternate plates, as shown. The overlapping edges of these armor plates are free from connection with each other, and are adapted to perceptibly slide with relation to each other. Each armor plate extends transversely of the protecting casing and is permanently attached to the inner section or strip 11, by means of brads or rivets 14, having their opposite ends flattened, whereby they present substantially flat surfaces with the surfaces of the sections 11 and 12. The armor plates 13 are free from connection with the upper section or strip 12. This is believed to be an important feature, as by having no connection between the armor plates and the outer section, the maximum degree of flexibility is obtainable, at the same time dispensing with the necessity of connecting the armor plates by hinges or hinged joints. While I have described and shown the armor plates as attached to the inner section, which is preferred, yet it is obvious that they may be attached to the outer section, and the invention practised with some degree of success. The free edges 9 of the sections or strips 11 and 12 are cemented or otherwise secured together at a point slightly spaced from the ends of the armor plates 13, but the armor plates substantially encircle the inner tube.

I have found that the protecting casing constructed as above stated, is exceedingly flexible, light, and may be conveniently handled, when inserting the same in the tire casing or shoe and when placing the inner tube within the same. The armor plates 13 are preferably constructed comparatively thin, the same serving to effectually prevent puncture of the inner tube but not substantially impairing the flexibility of the protecting casing or tire casing or shoe.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. A protecting casing for receiving the inner tube of a double tube tire, comprising inner and outer highly flexible sections connected near their edges and separated throughout the remainder of their inner surfaces, highly flexible thin relatively non-resilient metallic armor plates arranged between and extending transversely of the inner and outer sections in overlapping relation to each other, attaching devices securing the tread portions of the metallic armor plates to the tread portion of the inner flexible section and having no connection with the tread portion of the outer flexible section, and attaching devices securing the inner ends of the metallic armor plates to the corresponding portions of the inner flexible section.

2. A highly flexible protecting casing for receiving the inner tube of a double tube tire, and highly flexible thin relatively non-resilient metallic armor plates arranged transversely of the tread portion of the protecting casing in overlapping relation and attached thereto, whereby the edges of the casing may be moved to outer positions and remain in such positions.

In testimony whereof I affix my signature in presence of two witnesses.

CHARLES SAUER.

Witnesses:
 FRANK E. HUFNAIL,
 CHARLES J. WOOD.